(12) United States Patent
Li et al.

(10) Patent No.: US 6,508,959 B1
(45) Date of Patent: Jan. 21, 2003

(54) PREPARATION OF ENERGY STORAGE MATERIALS

(75) Inventors: Lin Song Li, Los Alamos, NM (US); Quanxi Jia, Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 0 days.

(21) Appl. No.: 09/867,843

(22) Filed: May 29, 2001

(51) Int. Cl.$^7$ ................................................ H01B 1/08
(52) U.S. Cl. ..................... 252/514; 252/514; 252/518.1; 252/521.2; 252/521.3; 106/1.15; 106/1.21; 106/1.28; 106/6.88; 423/179.5; 423/594; 427/126.5; 427/380; 428/446; 428/688; 501/53
(58) Field of Search ............................... 252/514, 518.1, 252/521.2, 521.3; 106/1.15, 1.21–1.28, 688; 423/179.5, 594; 427/126.5, 380; 501/53; 428/446, 688

(56) References Cited

U.S. PATENT DOCUMENTS

| | | | | |
|---|---|---|---|---|
| 5,763,091 A | * | 6/1998 | Kawata et al. | 428/325 |
| 5,853,869 A | * | 12/1998 | Adachi et al. | 428/325 |
| 6,144,106 A | * | 11/2000 | Bearinger et al. | 257/789 |
| 6,303,229 B2 | * | 10/2001 | Takahama et al. | 427/387 |
| 6,368,668 B1 | * | 4/2002 | Kobayashi et al. | 427/376.2 |

FOREIGN PATENT DOCUMENTS

| | | | | |
|---|---|---|---|---|
| JP | 06157819 | * | 6/1994 | C08K/7/18 |
| JP | 07247445 | * | 9/1995 | C09D/5/00 |

* cited by examiner

*Primary Examiner*—Mark Kopec
*Assistant Examiner*—Kallambella Vijayakumar
(74) *Attorney, Agent, or Firm*—Bruce H. Cottrell

(57) ABSTRACT

A process is provided for the preparation of a metallic oxide composite including mixing an aqueous solution of a water-soluble metal compound and colloidal silica, depositing the mixture upon a substrate, heating the mixture-coated substrates at temperatures from about 150° C. to about 300° C. for time sufficient to form a metallic oxide film, and, removing the silica from the metallic oxide film whereby a porous metal oxide structure is formed.

4 Claims, 5 Drawing Sheets

PREPARATION OF ENERGY STORAGE MATERIALS

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates to a process for fabrication of conductive oxides as electrodes for electrochemical capacitors. The process has the features of low cost, easy setup, low processing temperature, and coating on irregular surface. The conductive oxides have the feature of controllable surface area and electrical properties.

BACKGROUND OF THE INVENTION

The traditional electrode materials for electrochemical capacitors are high surface area carbon, metal oxides, and conducting polymers. Ruthenium oxide ($RuO_2$) has been identified as one of the best materials for this purpose.

Several deposition techniques have been used to prepare $RuO_2$ films. These techniques include reactive sputtering, metalorganic chemical vapor deposition (MOCVD), pulsed laser deposition, low-temperature chemical vapor deposition, and oxygen plasma-assisted molecular beam epitaxy. These methods tend to produce dense $RuO_2$ films that have small surface area and exhibit low power storage density. Recently, the hydrous form of ruthenium oxide ($RuO_2 \cdot xH_2O$) with amorphous structure has been demonstrated to be an electrode material for electrochemical capacitors (see, Zheng et al., J. Electrochem. Soc., 142, L6 (1995) and U.S. Pat. No. 6,097,588). Ruthenium oxides for electrochemical capacitors are also described in U.S. Pat. No. 5,600,535, U.S. Pat. No. 6,025,020, and U.S. Pat. No. 6,133,159.

A similar thin film growth technique used to grow $RuO_2$ at higher temperatures of greater than 500° C. was described in pending patent application of Jia et al., Ser. No. 09/629,116, filed Jul. 20, 2000 for "Polymer-assisted Aqueous Deposition of Metal Oxide Films".

It is an object of the present invention to provide a process for preparation of conductive metal oxide films.

It is a further object of the invention to provide a process for preparation of such conductive metal oxide films with controllably increased surface area.

It is a still further object of the invention to provide a process for preparation of such conductive metal oxide films with controllable electrical properties.

SUMMARY OF THE INVENTION

In accordance with the purposes of the present invention, as embodied and broadly described herein, the present invention provides a process for the preparation of a metallic oxide composite including mixing an aqueous solution of a water-soluble metal compound and colloidal silica, depositing said mixture upon a substrate, heating the mixture-coated substrates at temperatures from about 150° C. to about 300° C. for time sufficient to form a metallic oxide film, and, removing said silica from said metallic oxide film whereby a porous metal oxide structure is formed.

The present invention further provides a composition of matter including a composite metal oxide film containing a conductive metal oxide in admixture with silica particles.

DETAILED DESCRIPTION

Figure 1:
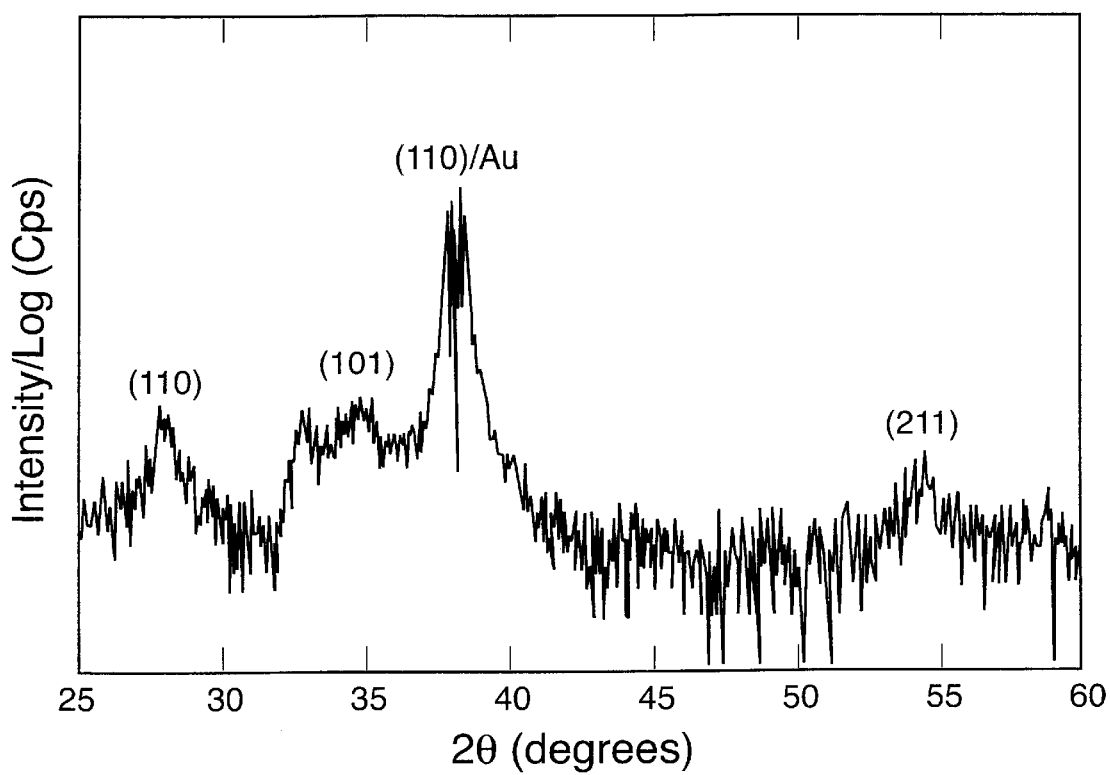
FIG. 1 is a plot of a x-ray diffraction pattern for a ruthenium oxide electrode made in accordance with the present invention.

The present invention concerns a process that can be used to prepare energy storage materials. Specifically, the process is aqueous deposition, and the materials are conductive metal oxides. The present invention also concerns a process to prepare films of conductive metal oxides with controllable surface area and electrical properties.

One embodiment of the process of this invention can be described as follows. Ruthenium (III) nitrosyl nitrate, Ru 31.96% (from Alfa Aesar) was chosen for making high surface area $RuO_2$ films. Deionized water was used to dissolve this chemical and the final concentration was typically around 10% ruthenium by weight. More generally, concentrations from about 1% ruthenium by weight to about 20% ruthenium by weight can be used.

The conductive metal oxide films can include metals such as ruthenium, rhodium, rhenium, osmium, iridium, or combinations of metals such as of lithium and cobalt, lithium and nickel or lithium and manganese. Ruthenium is especially preferred as the metal for preparation of ruthenium oxide films. $LiCoO_2$ films has been prepared from combinations of lithium and cobalt.

The surface area can be controlled by the following approach. A dispersion of colloidal silica can be mixed with the aqueous solution of a metallic compound and can result in a variable viscosity in the resultant solution. A typical concentration of silica within the dispersion can be around about 20% of silica by weight, remainder the liquid medium. The liquid medium can be an organic liquid such as methanol, ethanol, propanol, isopropanol, butanol and the like or may be water. Various ratios of the mixture of the metal, e.g., ruthenium, and colloidal silica solution can be used and such ratios can generally range from about 10:1 to about 1:5 by weight for making the metal oxide films.

The silica particles can be spherical, can be elongated with an aspect ratio of up to about 15:1. The typical particle size of spherical silica particles within a dispersion can generally be in the range of from about 10 nanometers (nm) to about 100 nm in greatest cross-sectional dimension. Elongated particles can typically have lengths from about 40 nm to about 300 nm and widths of from about 5 nm to about 20 nm although the dimensions can be varied if desired.

Then, this homogenous solution was spun coated onto a suitable substrate from among glass, quartz, indium-tin oxide (ITO), titanium foil, $LaAlO_3$, silicon and a composite of gold and silicon, i.e., a commercial silicon wafer with a layer of gold sputtered thereon. Selected polymers may also be used as the substrate depending upon the particular annealing temperature and melting point of the polymer. The spin speed can generally be from about 3000 rpm to 6000 rpm, although lower and higher spin rates may also be employed. Although the homogenous solution is preferably spin coated on the substrate, various alternative methods of applying the homogenous solution to a substrate are contemplated, including spray coating, dip coating, brushing, doctor blading, and the like. Thick metal oxide films can be made by spin coating on the substrates several times.

Finally, the coated silica-ruthenium composite films can be calcined at a temperature in the range of about 150° C. to about 300° C., more preferably from about 150° C. to about 260° C., for periods of time up to several hours to yield the resultant films with the desired crystallinity such as amorphous or microcrystalline. Lower temperatures are preferred to obtain the amorphous structure. Such an amorphous structure is generally preferred for electrochemical capacitor applications.

High surface area metal oxide films can be achieved by etching or leaching the silica. Such etching or leaching can be accomplished by immersion or soaking in a dilute hydrofluoric acid (HF) solution or in a dilute solution of HF buffered with, for example, ammonium fluoride ($NH_4F$) commonly referred to as buffered HF. Alternative methods may include dry etching, flushing, or rinsing the calcined structure with dilute hydrofluoric acid. In other alternative methods, the leaching reagents need not be restricted to hydrofluoric acid, but may comprise any other reagents, so long as it dissolves the silica at least in part without impacting the metallic oxide. Contemplated leaching reagents may include $NF_3$, and solvents according to the formula $CH_zF_{4-z}$, wherein z =0–3, and the formula $C_2H_xF_y$, wherein x is an integer between 0 and 5, and x+y is 6. In this example, the hydrofluoric acid reacts and disintegrates the silica, resulting in dissolving or leaching the silica from the film and thus forming pores. Moreover, porous metal oxide powder such as $RuO_2$ powder can be prepared in a similar manner.

The existing approaches to prepare conductive oxides for electrodes of electrochemical capacitors suffer from the high cost of the setup, the less control of surface area, and the difficulty for coating on irregular surface. In comparison to the sol-gel process (see U.S. Pat. No. 5,600,535), this invention is more controllable and reproducible. The ability to control the surface area of the ruthenium oxide film, which is very important to maximize the energy storage per unit weight of metal oxides, is more readily available by the process of this invention as compared to other processes. The surface area of the resultant metal oxide can be controlled by choosing the weight percentage, the size, and/or the shape of the silica colloids.

This invention itself provides a cost-effective approach to grow conductive metal oxides. The combination of the process and the formation of high surface area conductive oxides used for electrodes of electrochemical capacitors should find tremendous application where high power density is needed such as power for electric vehicles, power for mobile telecommunications, and power for other standalone electronic devices.

The present invention is more particularly described in the following examples which are intended as illustrative only, since numerous modifications and variations will be apparent to those skilled in the art.

EXAMPLE 1

Colloidal silica in methanol (MA-ST-UP, from Nissan Chemical Industries, $SiO_2$ 20% wt) was added in ruthenium (III) nitrosyl nitrate aqueous solution (containing 10 % by wt ruthenium). The silica particles were elongated with a width of from about 5 nm to about 20 nm and a length of from about 40 nm to about 300 nm. The weight ratio of ruthenium:silica was maintained at about 1:2. A metal-colloid composite film was formed by coating the solution onto the gold surface of a gold/silicon composite wafer at a spinning speed of 3000 rpm over 30 seconds. The substrates were heated to 260° C. and kept at this temperature for 10 minutes to immobilize this metal-colloidal thin film by drying. This process was repeated 10 times in order to fabricate a thick $RuO_2/SiO_2$ composite films. The final coated substrate was heated at 260° C. for 3 hours. Subsequently, the coated substrate was dipped in a 5% HF solution for one hour or more whereupon the colloidal silica was removed completely by the HF. A metallic conductive ruthenium oxide thin film with a porous structure was thus obtained.

Figure 2:
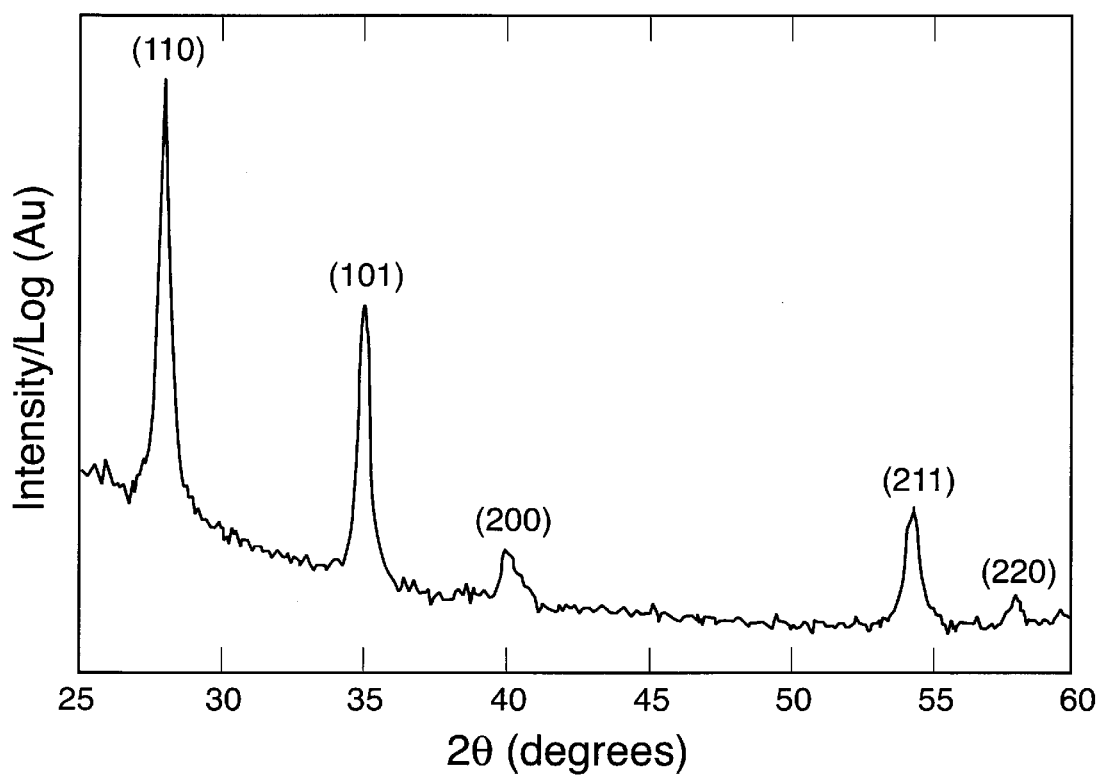
FIG. 2 is a plot of a x-ray diffraction pattern for a ruthenium oxide electrode made in accordance with the present invention.

FIG. 1 shows the x-ray diffraction of the porous $RuO_2$ film. SEM and TEM examination of the films also revealed the porous structure. The thermal treatment temperature was 260° C. It is clear that the film shows the $RuO_2$ phase. The very weak and broad peak (note the Log scale) is due to the microcrystalline nature or the small grain size of the film. In comparison, the FIG. 2 shows the x-ray diffraction pattern of a film annealed at 500° C. The sharper and narrower diffraction peak, compared to FIG. 1, indicated the crystalline nature and/or large grain size of the film annealed at higher temperatures.

Figure 3:
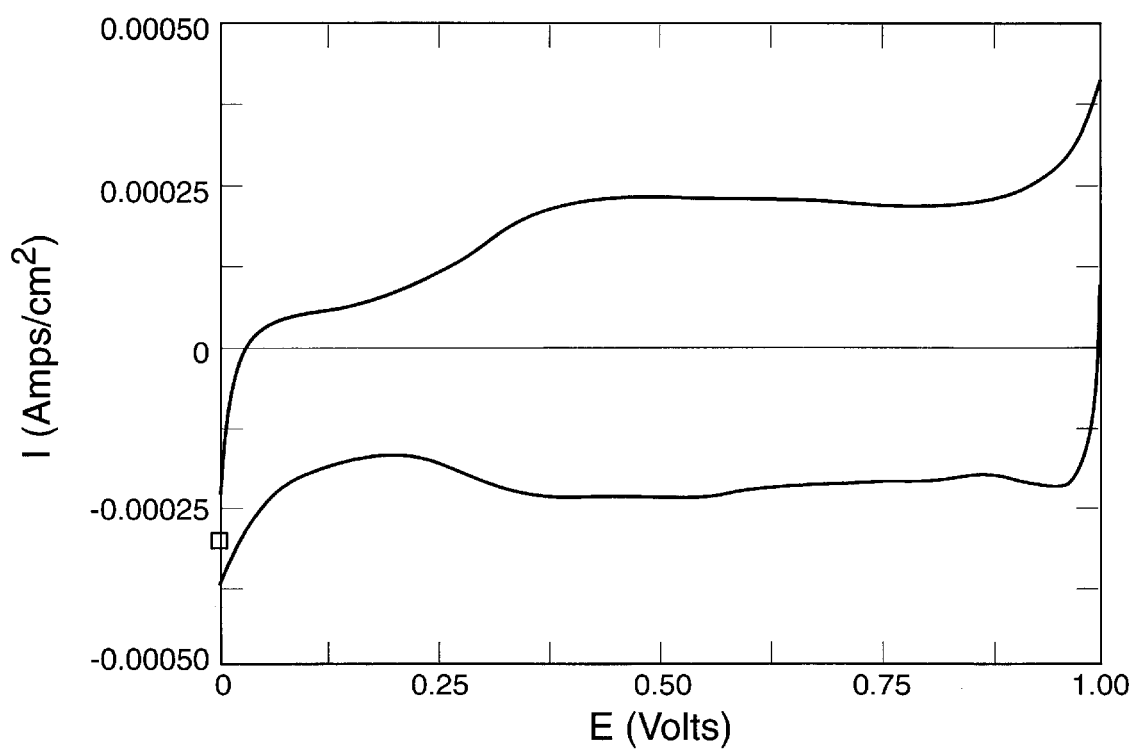
FIG. 3 is a cyclic voltammogram of a film electrode made in accordance with the present invention.

FIG. 3 shows the cyclic voltammetry (CV) results, the interfacial capacitance was about 0.04 $F/cm^2$ for the films annealed at 260° C. During the measurement, the current (i) was measured when the voltage (V) was linearly scanned. The capacitance (C) is calculated based on $C=dQ/dV=(dQ/dt)/(dV/dt)=i/s$, where Q is the charge and s is the voltage scan rate. Symmetrical oxidation and reduction current was obtained. Higher annealed temperature, which leads to polycrystalline or large $RuO_2$ grain size, reduces the energy storage capacity.

EXAMPLE 2

Colloidal silica in isopropanol (IPA-ST, from Nissan Chemical Industries, $SiO_2$ 30% wt) was added in ruthenium (III) nitrosyl nitrate aqueous solution (containing 10% by wt ruthenium). The silica had a sphere-like shape and the particle size was from about 10 nm to about 20 nm. The weight ratio of ruthenium:silica was maintained at about 1:4. A metal-colloid composite film was obtained by coating the solution onto the gold surface of a gold/silicon composite wafer at a spinning speed of 3000 rpm over 30 seconds. Then, the substrate was heated to 260° C. and kept at this temperature for 10 minutes to immobilize this metal-colloidal thin film by drying. This process was repeated 10 times in order to fabricate a thick $RuO_2/SiO_2$ composite film. Finally, the coated substrate was heated at 260° C. for 3 hours. Subsequently, the coated substrate was dipped in a 5% HF solution for one hour or more whereupon the colloidal silica was removed completely by the HF. A metallic conductive ruthenium oxide thin film with a porous structure was thus obtained.

Figure 4:
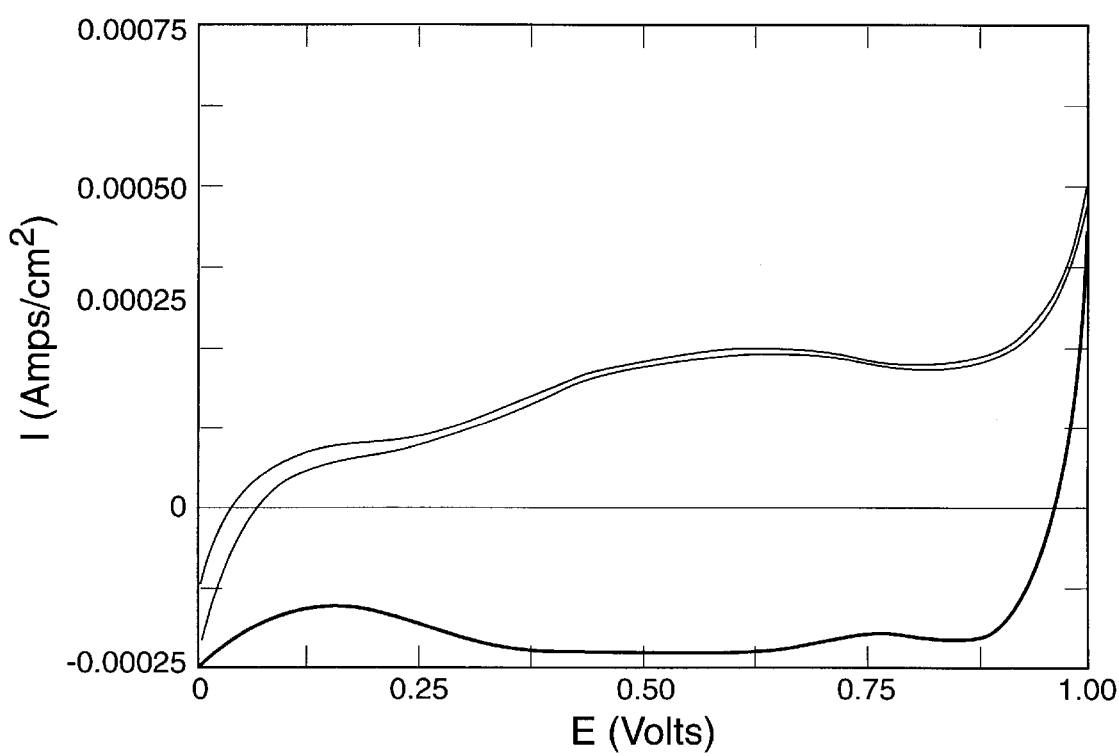
FIG. 4 is another cyclic voltammogram of a film electrode made in accordance with the present invention.

From cyclic voltammetry (CV) results, the interfacial capacitance was about 0.038 $F/cm^2$ (see FIG. 4).

EXAMPLE 3

Colloidal silica in water (SNOWTEX-UP, from Nissan Chemical Industries, $SiO_2$ 20% wt) was added in ruthenium (III) nitrosyl nitrate aqueous solution (containing 10 % by wt ruthenium). The colloidal silica particles were elongated with a width of about 5 nm to about 20 nm and a length of about 40 nm to about 300 nm particles. The weight ratio of ruthenium:silica was maintained at 1:3. This ratio can be changed from 10:1 to 1:5 for making $RuO_2$ powder. Then, the solution was dried in a container or on any surface under atmosphere. The powder sample was heated to 260° C. for 3 hours. Subsequently, the coated substrate was dipped in a 5% HF solution for one hour or more whereupon the colloidal silica was removed completely by the HF. A metallic conductive ruthenium oxide powder with a porous structure was thus obtained.

EXAMPLE 4

Colloidal silica in water (SNOWTEX-O, from Nissan Chemical Industries, $SiO_2$ 20% wt) was added in ruthenium (III) nitrosyl nitrate aqueous solution (containing 10% by wt ruthenium). The silica particle size was about 10 nm to about 20 nm. The weight ratio of ruthenium:silica was maintained at 1:3. This ratio can be changed from 10:1 to 1:5 for making $RuO_2$ powder. Then, this solution was dried in a container or on any surface under atmosphere. The powder sample was heated to 260° C. for 3 hours. Subsequently, the coated substrate was dipped in a 5% HF solution for one hour or more whereupon the colloidal silica was removed completely by the HF. A metallic conductive ruthenium oxide powder with a porous structure was thus obtained.

Figure 5:
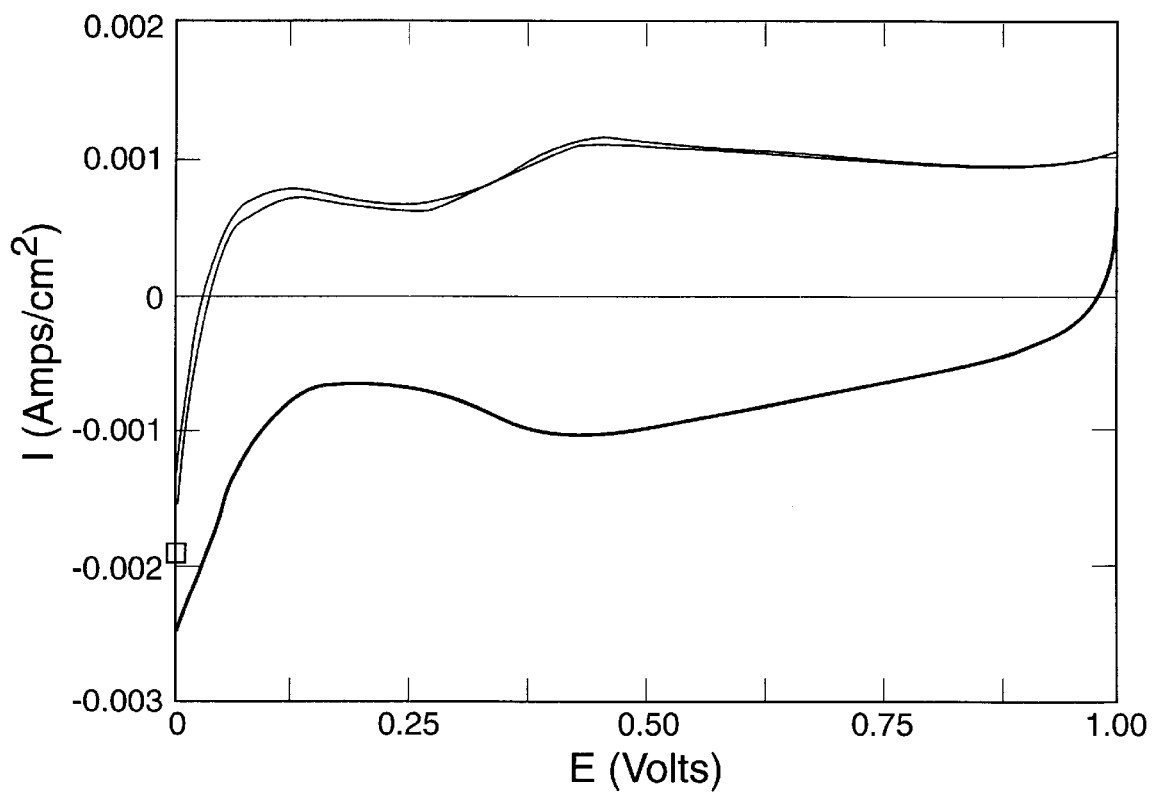
FIG. 5 is still another cyclic voltammogram of a film electrode made in accordance with the present invention.

FIG. 5 shows the cyclic voltammetry (CV) results. The specific capacitance based on the powder weight was about 64 F/g.

EXAMPLE 5

Colloidal silica in water (SNOWTEX-O, from Nissan Chemical Industries, $SiO_2$ 20% wt) was dried in a container or on any surface under atmosphere. The silica particle size was about 10 nm to about 20 nm. Ruthenium (III) nitrosyl nitrate aqueous solution (containing 10% by wt ruthenium) was then dropped on silica powder and part of ruthenium solution was adsorbed into the powder. The weight can be increased up to 3 times. Finally, this powder sample was heated to 260° C. for 3 hours. Subsequently, the powder was dipped in a 5% HF solution for one hour or more whereupon the colloidal silica was removed completely by the HF. A metallic conductive ruthenium oxide powder with a porous structure was thus obtained.

Although the present invention has been described with reference to specific details, it is not intended that such details should be regarded as limitations upon the scope of the invention, except as and to the extent that they are included in the accompanying claims.

What is claimed is:
1. A composition of matter comprising:
   a composite metal oxide film containing a conductive metal oxide in admixture with silica particles, wherein the conductive metal oxide includes at least one metal oxide selected from the group of metals consisting of ruthenium, rhodium, rhenium, osmium, iridium, and a combination of lithium and cobalt, and
   wherein said silica particles are elongated in shape.
2. The composition of claim 1 wherein said silica particles further include spherical particles.
3. The composition of claim 1 wherein said conductive metal oxide is ruthenium oxide.
4. The composition of claim 1 wherein said conductive metal oxide is lithium cobalt oxide.

\* \* \* \* \*